Patented Dec. 12, 1950

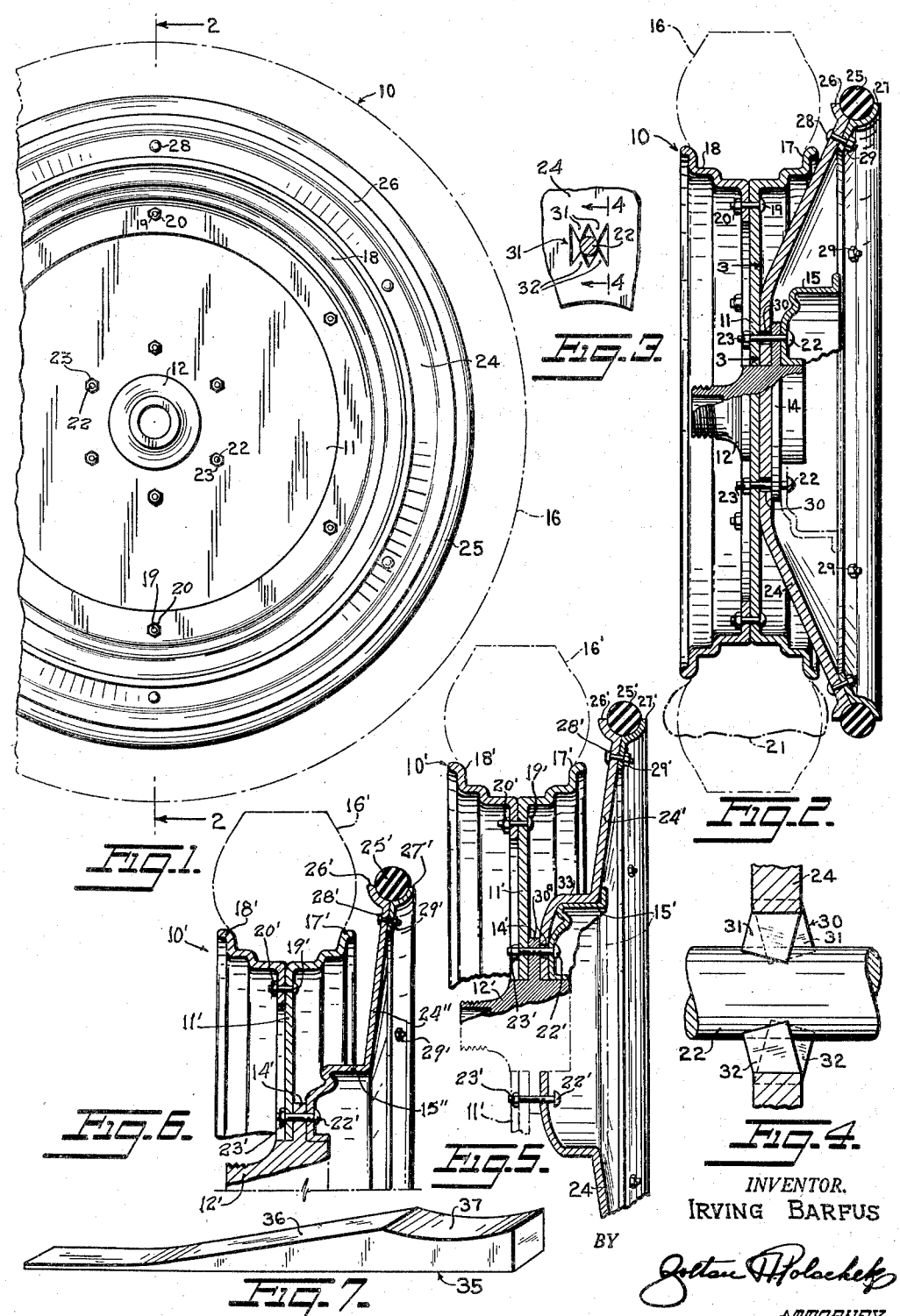
Dec. 12, 1950     I. BARFUS     2,533,869
RELIEF WHEEL FOR AUTOMOTIVE VEHICLES
Filed Jan. 29, 1949
INVENTOR.
IRVING BARFUS
BY
ATTORNEY

2,533,869

UNITED STATES PATENT OFFICE 2,533,869

RELIEF WHEEL FOR AUTOMOTIVE VEHICLES

Irving Barfus, Brooklyn, N. Y.

Application January 29, 1949, Serial No. 73,600

3 Claims. (Cl. 301—38)

This invention relates to new and useful improvements in safety devices for attachment to the wheels of vehicles, as to the wheels of automotive vehicles, which have pneumatic tires subject to puncture, blow-out or other damage sufficient to cause a sudden deflation of the tire and hence constituting an ever-present potential danger in present-day high-speed travel on modern smoothly paved roads.

More particularly, the present invention pertains broadly to appliances in the nature of additional or emergency wheel elements each to be fixed relative to an inflated tire-carrying wheel (hereinbelow called the primary wheel) of the vehicle, and as thus fixed positioned to engage the road when and only when there is a deflation of the pneumatic tire of the associated primary wheel; whereby then the emergency or reserve wheel, because always rotating with the adjacent primary wheel, insures that the weight of the vehicle is immediately transferred from the primary wheel to the reserve wheel.

As a result, serious accidents of the kind now occurring may be avoided. The vehicle, following a blow-out, may easily be controlled while travelling under its momentum, or even while continuing to travel under power from its engine in the case of a driver having a slow reflex. Furthermore, while the vehicle is being brought to a stop, and also while thereafter if necessary the vehicle is being slowly driven to a service station for the needed tire repair, the tire will not be rim-cut or otherwise injured even with the primary wheel carrying the same having to travel for a considerable distance on its tire rim. A further advantage of the arrangement just described is that a jack need not be used, preparatory to substitution of a spare tire for the one having the blow-out, as a roadside replacement job.

A feature of the reserve wheel of the present invention is that, the same structurally may be in effect carried directly by the axle on which the vehicle wheel is mounted, as on the hub of the primary wheel, to simplify and strengthen the reserve wheel and its mounting relative to the chassis.

Substantially all automotive vehicles have at least two brake-drums one at each of at least two of its primary wheels, and many late model vehicles are equipped with four-wheel brakes, so that there is a brake-drum at each wheel. A further feature of the invention is that the inner portion of the new reserve wheel may be fortified by abutment against a brake-drum, and in one form of the invention the road-reactive load-thrust on the new reserve wheel when automatically becoming effective for emergency use is directly transmitted to the axle through the adjacent brake-drum.

A further feature of the invention is that a reserve wheel is provided, characterized by the advantages above mentioned, and which, moreover, is readily demountable; and in this connection, still another feature of the invention is the provision of such a reserve wheel, the inclusion of which coactively relative to an adjacent primary wheel, does not interfere with the ready demountability of the primary wheel, nor with the ready demountability of the pneumatic tire of said primary wheel.

In its preferred forms, the new reserve wheel, which, as will be understood, has a tread-diameter properly less than that of the primary wheel while the tire of the latter is safely inflated yet a tread-diameter which is properly greater than the diameter of the primary wheel at the outer periphery of its tire rim, is provided with a resilient cushioning tread, as one of solid rubber; and another feature of the invention, in this connection, is the provision of a reserve wheel with such a cushioning tread, with a rim for mounting the latter, and with said rim of the demountable type thereby to permit ready substitution of a new cushioning tread for one worn or damaged.

A still further object of the present invention proposes providing the emergency wheel elements with means for securing the holding bolts in position while the nuts are being tightened so that the holding bolts will not rotate during such tightening.

Another object of the present invention proposes forming the emergency wheel elements integrally with the radially extending flange of the brake-drum in a manner so that the emergency wheel will be a unit therewith.

It is a further object of the present invention to form an emergency wheel for use in connection with standard vehicle wheels which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a fragmentary side elevation of a conventional automobile wheel combined with the reserve wheel of the present invention and looking from the left-hand side of Fig. 2.

Fig. 2 is a vertical section, taken substantially on the line 2—2 of Fig. 1.

Fig. 3 is an enlarged detail view, this being a section taken on the line 3—3 of Fig. 2.

Fig. 4 is a still further enlarged detail view, this being a section taken on the line 4—4 of Fig. 3.

Fig. 5 is fragmentarily a vertical section like Fig. 2, but showing another now favored embodiment of the reserve wheel of the invention.

Fig. 6 is a view similar to a portion of Fig. 5, but illustrating the emergency wheel constructed in accordance with a still further modification of the present invention.

Fig. 7 shows in perspective a light-weight and conveniently portable ramped member, for use on the road in tire changing relative to a primary wheel.

Referring now to the drawing more in detail, and first to Figs. 1-4, the primary wheel illustrated is marked as a whole 10 and is shown as including a main annular disk 11 having a central opening for separable connection of the said disk with the hub 12 of said wheel. Such a hub commonly has an external annular flange 14 against the front side of which the rear side of the disk 11, or an equivalent, abuts in the usual case. It is also common practice to secure the brake-drum 15 to the hub 12 with the closed side of the brake-drum abutted against the rear side of the flange 14, as shown in Fig. 2.

Also included in the primary wheel 10 there is a rim structure for mounting the inflated tire 16. In this case, also, a conventional arrangement is shown, including a rim-half 17 integral with the disk 11, and a demountable rim-half 18 detachably held in place by bolts 19 and nuts 20. On a bad puncture, blow-out or other damage to the tire 16, the same becomes deflated, say as indicated at the heavy dot and dash line 21, in Fig. 2.

Ordinarily, the disk 11 or equivalent, the brake-drum 15, and the hub 12, are all locked together, and in a manner to permit ready demounting of the disk, by bolts 22 and nuts 23. As will be seen in a moment, this or an equivalent provision may be present in the combination of the invention.

The new reserve wheel as shown in Figs. 1-4 comprises a dished disk 24 having a central opening for taking around the hub 12. Also included in said reserve wheel is a rim structure for mounting a cushioning means, preferably, as shown, a solid rubber tire 25 of circular cross-section. Said rim structure includes a rim-half 26 integral with the disk 24, and a demountable rim-half 27 detachably held in place by bolts 28 and nuts 29.

In the arrangement of Figs. 1 and 2, it will be noted, the reserve wheel 24 is interposed between the disk 11 of the primary wheel 10 and the flange 14 of the hub 12 of said wheel 10, so that the same bolts 22 as are ordinarily used to detachably secure said hub and disk may also be used to detachably mount the reserve wheel 24, as shown; the wheel 24 having apertures 30 arranged matchingly relative to the apertures in the disk 11 for coacting with the bolts 22.

As illustrated best in Figs. 3 and 4, said apertures 30, one of which is there shown, is of what may be called the snap-on type; the same being shaped to have an outline according to the principle typified in Fig. 3, that is, to establish oppositely extending sets of prongs 31 and 32, with each of the two prongs 31 oppositely canted and with each of the other two prongs 32 oppositely canted, as in Fig. 4.

From an inspection of Fig. 4, it will be noted that as the nuts 23 are tightened on the bolts 22, the sets of prongs 31 and 32 will be compressed into the plane of the material of the wheel 24. This will cause the pointed ends of the sets of prongs 31 and 32 to dig into the material of the bolt 22 and retain the bolts against rotation so that the nuts may be conveniently completely tightened.

Referring to the modification of Fig. 5, wherein the parts to which are applied reference numerals with primes added correspond, respectively, to the parts in Fig. 2 to which are applied reference numerals without primes, here the reserve wheel 24' is shown as so shaped that it is not only carried by and in load-thrust relation to the hub 12' of the primary wheel 10', as in Figs. 1 and 2, but also it is carried by and in load-thrust relation to the brake-drum 14'. In this connection, note the special formation at the inner annular portion of the disk constituting substantially the entirety of the reserve wheel 24; which formation, designated 33, is cup shaped to girth the exterior of the brake-drum.

Thus, in Figs. 1 and 2 the reserve or safety wheel and the brake-drum are positionally and functionally closely related yet easily separable elements; whereas in Fig. 5 the reserve or safety wheel and the brake-drum are positionally and functionally, in effect, a single unit.

As indicated at 30a in Fig. 5, the special apertures illustrated in Figs. 3 and 4 may desirably be used in connection with the arrangement of Fig. 5.

In the further modification of the invention shown in Fig. 6, the formation of the auxiliary wheel 24'' is similar to that shown in Fig. 5, except that the same is integrally formed with the radially extending flange of the brake drum 15''.

In other respects the form of the invention shown in Fig. 6 is similar to that shown in Fig. 5 and like reference numerals identify like parts in each of the several views.

Referring to Fig. 7, a useful form of elongate block 35 is here illustrated, which block may be made of wood and so kept light in weight, and may be of a short enough length to be conveniently carried at all times in any automotive vehicle. Said block has a ramped surface 36, beyond the upper end of which is an arcuately concave recess 37. On the sudden deflation from any cause of the tire of the primary wheel, said block at the lower end of its ramped surface may be placed at and in line with the associated reserve wheel, and then the vehicle may be slowly advanced, or backed up, as the case may be, until said reverse wheel, leaving the upper end of the ramp, becomes cradled in the recess 37. Now the deflated tire may be removed, and a new one substituted; the need for a jack having been entirely eliminated. If the driver of the vehicle decides that it be necessary to proceed to the nearest service station, for tire repair and replacement or substitution, the block 35 is not used; but safe propulsion of the vehicle to said service station may be had, without further damage to the deflated tire, consequent upon the coming into emergency-use operative position, this automatically as the result of such tire deflation, of the reserve wheel at the deflated-tire location.

To minimize the space needed for the accommodation of the reserve wheel, the disk 24 or 24' or an equivalent when stamped from fairly thin sheet metal could be given adequate strength by shaping such disk to include curvilinearly extending channels, radially extending channels or both. In manufacturing the new wheel combination, the reserve wheel could be made a permanent addition to the primary wheel and so a permanent component of the combination.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. The combination with a primary wheel of a vehicle of a reserve wheel of less diameter than the primary wheel, means for securing the reserve wheel to the primary wheel for rotation therewith, comprising sheet-like inner annular portions on each of the wheels which are in facial contact with each other, said annular portions being formed with spaced sets of aligned apertures, bolts having their shank portions passing through said sets of aligned apertures for having nuts threaded thereon to draw said annular portions into tight facial contact, and oppositely disposed pairs of projections formed on the material of said annular portion of the reserve wheel defining the apertures of the reserve wheel, the projections of each pair of projections being oppositely canted to be compressed for gripping the shank portions of said bolts after the nuts have been partially tightened into position for holding the bolts against rotating while the nuts are being completely tightened into position against the adjacent face of the adjacent annular portion.

2. The combination with a primary wheel of a vehicle of a reserve wheel of less diameter than the primary wheel, means for securing the reserve wheel to the primary wheel for rotation therewith, comprising sheet-like inner annular portions on each of the wheels which are in facial contact with each other, said annular portions being formed with spaced sets of aligned apertures, bolts having their shank portions passing through said sets of aligned apertures for having nuts threaded thereon to draw said annular portions into tight facial contact, and means on said annular portion of the reserve wheel for gripping the shank portions of said bolts after the nuts have been partially tightened into position for holding the bolts against rotating while the nuts are being completely tightened into position against the adjacent face of the adjacent annular portion, said apertures of said annular portion of the reserve wheel being slightly larger than the external diameter of the shank portions of said bolts, the material of said annular portion of said reserve wheel defining the apertures of that annular portion being shaped to provide oppositely disposed sets of pointed prongs having their pointed ends engaging the shanks of said bolts forming said gripping means.

3. The combination with a primary wheel of a vehicle of a reserve wheel of less diameter than the primary wheel, means for securing the reserve wheel to the primary wheel for rotation therewith, comprising sheet-like inner annular portions on each of the wheels which are in facial contact with each other, said annular portions being formed with spaced sets of aligned apertures, bolts having their shank portions passing through said sets of aligned apertures for having nuts threaded thereon to draw said annular portions into tight facial contact, and means on said annular portion of the reserve wheel for gripping the shank portions of said bolts after the nuts have been partially tightened into position for holding the bolts against rotating while the nuts are being completely tightened into position against the adjacent face of the adjacent annular portion, said apertures of said annular portion of the reserve wheel being slightly larger than the external diameter of the shank portions of said bolts, the material of said annular portion of said reserve wheel defining the apertures of that annular portion being shaped to provide oppositely disposed sets of pointed prongs having their pointed ends engaging the shanks of said bolts forming said gripping means, the prongs of each set of prongs being oppositely canted out of the plane of the annular portion so as to be pressed into the plane of that annular portion as the nuts are tightened onto the shank portion of said bolts causing the pointed ends of said prongs to dig into the shank portions of said bolts.

IRVING BARFUS.

REFERENCES CITED

The following references are of record in the file of this patent:

UNITED STATES PATENTS

| Number | Name | Date |
| --- | --- | --- |
| 2,160,199 | Cornelissen | May 30, 1939 |
| 2,170,647 | Ash | Aug. 22, 1939 |
| 2,203,774 | Cornelissen | June 11, 1940 |
| 2,234,838 | Briskman | Mar. 11, 1941 |